UNITED STATES PATENT OFFICE.

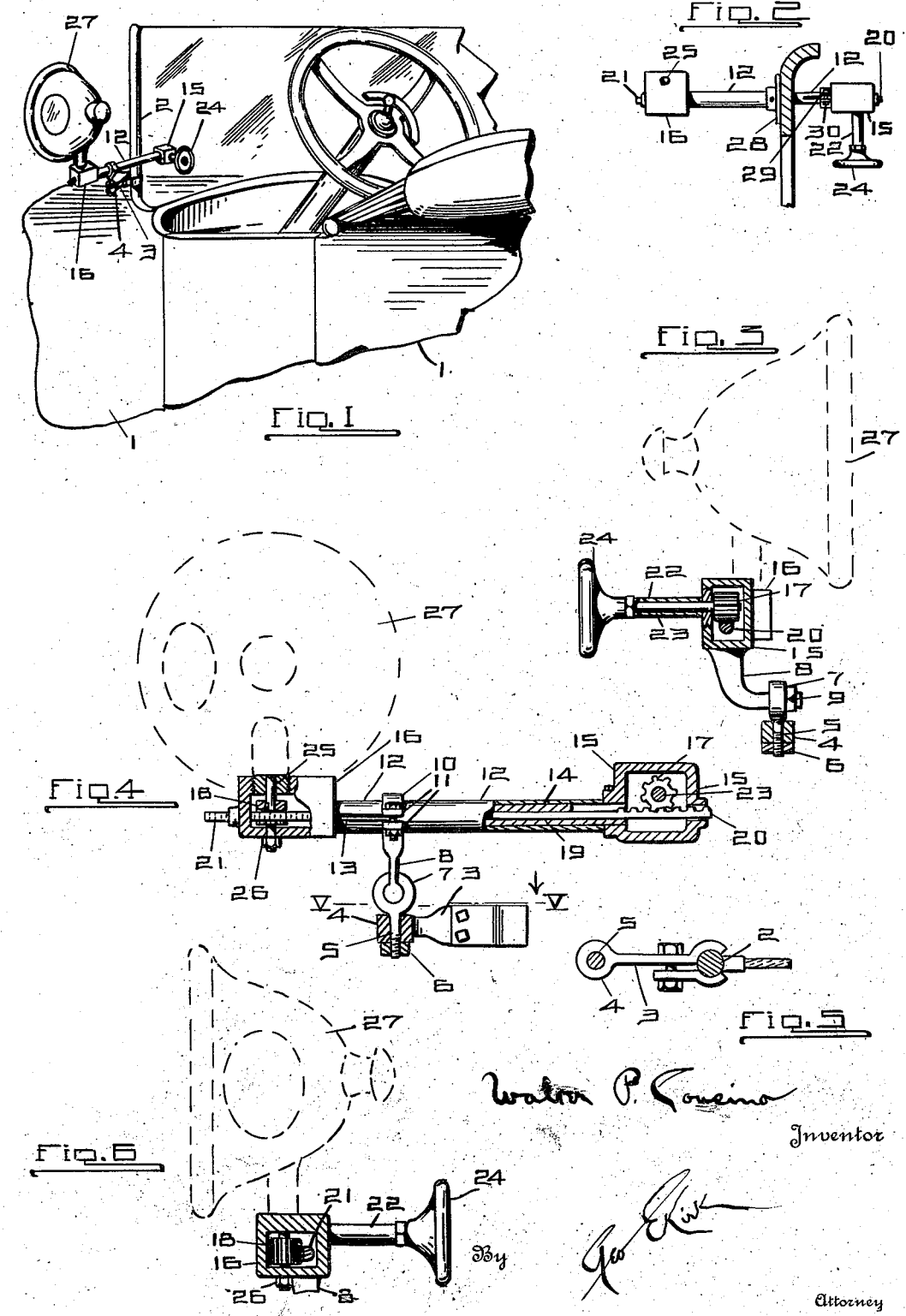

WALTER P. COUSINO, OF CURTICE, OHIO.

SPOT-LIGHT-MOUNTING DEVICE.

1,327,945. Specification of Letters Patent. Patented Jan. 13, 1920.

Application filed February 14, 1919. Serial No. 277,032.

*To all whom it may concern:*

Be it known that I, WALTER P. COUSINO, a citizen of the United States of America, residing at Curtice, Ottawa county, Ohio, have invented new and useful Spot-Light-Mounting Devices, of which the following is a specification.

This invention relates to controllable mountings, especially for searchlights or spotlights.

This invention has utility when incorporated in connection with spotlights for motor vehicles, more particularly for wide range of control from within the car.

Referring to the drawings:—

Figure 1 is a fragmentary perspective view of a motor vehicle, open type, having the mounting of the invention incorporated therewith;

Fig. 2 is a fragmentary plan view showing the device for mounting in connection with a closed car;

Fig. 3 is a view of the mounting device with the light thereon from the inner side thereof, parts being shown in section.

Fig. 4 is a view from the rear, parts being broken away;

Fig. 5 is a section on the line V—V Fig. 4; and

Fig. 6 is a view from the outer side of the device showing the light in mounting position.

The vehicle 1 is shown as having the windshield frame 2 carrying the clamp bracket 3 providing the eye 4 as the usual spotlight mounting. Extending through this eye 4 is the stem 5 to be held by the nut 6 mounting the eye 7 for the bracket member 8 held therein fixedly by the nut 9. Bolt 10 through the ears 11 of this split bracket member 8 coacts for clamping the tubular guide 12 having the split portion or slot 13 therein. In this tubular guide 12 as held by the clamp 8 frictionally for rocking is the second tubular member 14. Housing brackets 15, 16, one at each end of the second tubular member 14, and fixed therewith, have therein respectively pinions 17, 18. Reciprocable within the inner or second tubular member 14 is the bar 19 having a terminal rack portion 20 in mesh with the pinion 17 and remote therefrom a terminal rack portion 21 in mesh with the pinion 18.

Fixed with the bracket 15 is a tubular stem 22 for the actuator stem 23 carrying the handle 24. The stem 23 is fast with the pinion 17 for rotating such pinion from the handle 24. This stem 23 has bearings in the bracket or housing 15, as does stem 25 have bearings in the bracket or housing 16. This stem 25 is mounted in position to carry the pinion 18 by a nut 26. This stem 25 carries the spotlight 27. This spotlight 27 may be rotated for full 360° movement with the stem 25 by rotating the pinion 18 as effected by rotating the hand wheel 24 within the car.

For directing the beam of the spotlight upward or downward the hand wheel 24 may be rocked to rock the bracket or housing 15 and with it the second tubular member 14 within its frictional guide 12. This transmits a rocking movement to the outer bracket or housing 16 and thus rocks the spotlight 27.

When used in connection with closed cars, a flange 28 is mounted fast with the outer fixed guide or tubular member 12. To provide for the frictional holding of the second tubular member 14 in the tubular member 12, there is the split clamp ring 29 having the gripping bolt 30 as shown in Fig. 2.

This device of the invention herein provides a mounting of universal direction or range applications which may be used with a standard or usual type of spotlight. The position of the handle 24 is convenient to the position of the steering wheel so that the driver of the vehicle may readily manipulate the spotlight to any position desired. This is exceptionally advantageous when the car is closed, for without taking attention from the steering of the vehicle, as in turning the dark corners at night, before the turning is effected from the steering wheel, the driver may shift, by rotating the handle 24, the spotlight 27 so that the direction of the desired driving is made clear to the driver. This may not only mean to find the direction but also the elevation or downward deflection may readily be had by additionally rocking the handle 24. Furthermore, this spotlight may be so shifted to give a clear light for backing, for it may be turned to give a viewpoint in the rear of the vehicle and further may be deflected to even direct its light within the vehicle.

When mounted in connection with open cars, the curtains may be drawn and the manipulation of the handle 24 made without opening the car. The provision of the guide 12 just back of the windshield is preferably so proportioned as to not interfere with the normal activities of the driver of the car or for access into the car by the door.

What is claimed and it is desired to secure by Letters Patent is:

1. A spotlight mounting device comprising a fixed guide, an angle bracket adjacent each end of the guide, a rotatable holder for a spotlight carried by one bracket, a rotatable actuator at the other bracket, means mounted in the guide operatively connecting the actuator with the holder reciprocable by rotation of the actuator to rotate the holder rotation on one axis, said actuator being rockable in addition to its rotation for rocking said means as to the fixed guide to rock the holder on an axis intersecting the axis of the rotation of the holder and at an angle to the rotation, which rocking and rotation effect universal shifting of the holder.

2. A spotlight mounting device comprising a fixed guide, a tubular relatively rockable bracket carrying member frictionally held in said guide, a reciprocable bar in said tubular member, and a rotatable spotlight holder mounted in the bracket rotatable by the bar and rockable with the member.

3. A spotlight mounting device comprising a first fixed outer tubular guide, a second tubular member frictionally held for rocking in said guide, a rack bar reciprocable in said second tubular member, and a spotlight holder pinion rotatable by the bar and carried with the second tubular member for providing universal directing means for the spotlight.

4. A spotlight mounting device comprising a fixed guide, a rockable member carried by the guide, a pair of pinions, mounting means carrying the pinions to rock with the member, a rack bar also carried with the rockable member and reciprocable relatively thereto, a spotlight mounting stem, one of said pinions mounted on said spotlight mounting stem, and an actuating handle coacting to drive the other pinion for rotating the spotlight mounting stem together with the pinion thereon, said handle being also bodily movable to rock the spotlight holder pinion in a transverse direction of movement to the rotation thereof.

5. A windshield, a spotlight mounting device including a guide sleeve, a friction clamp anchored adjacent said windshield and embracing said sleeve, a spotlight carrying bracket at one side of said clamp, and a handle extending rearwardly from the sleeve at the other side of the clamp, said handle being movable to rotate said sleeve as to the clamp to rock the spotlight bracket, and said handle being rotatable to oscillate the spotlight bracket on an axis intersecting the axis of the sleeve.

6. A windshield frame, a spotlight mounting device mounted on said frame and including a guide projecting laterally therefrom, a spotlight carrying bracket on the outer end of said guide, and a handle transversely extending rearwardly on the inner end of said guide, said handle connected through the guide to rock the spotlight bracket on said guide as a horizontal axis, and said handle rotatable to oscillate the spotlight bracket on an axis intersecting the axis of the guide.

In witness whereof I affix my signature.

WALTER P. COUSINO.

DISCLAIMER 1,327,945.—*Walter P. Cousino*, Curtice, Ohio. SPOT-LIGHT-MOUNTING DEVICE. Patent dated January 13, 1920. Disclaimer filed June 15, 1932, by the assignee, *International Spotlight Corporation*.

Therefore enters this disclaimer and disclaims from the scope of claim 5 of said Patent 1,327,945 any spotlight mounting device excepting one wherein oscillation of the spotlight on the bracket is effected without movement of the interior operating connections transversely of the sleeve guide whose cross section is thus kept small and one wherein the handle grip of the handle surrounds its own axis of rotation, whereby the oscillation of the spotlight on the bracket may be accomplished by twirling the handle and which facilitates combined simultaneous oscillating of the spotlight on the bracket and rocking of the spotlight bracket with the sleeve; and disclaims from the scope of claim 6 of said Patent 1,327,945 any spotlight mounting device excepting one wherein the connection between the handle and spotlight for oscillating the latter on the bracket is confined within the guide against movement transverse to the guide axis and one wherein the handle has a gear at its inner end and the axis of rotation of the handle passes axially through both said gear and the hand grip portion of the handle, whereby the mechanical advantage of the handle to effect rocking of the spotlight bracket on the horizontal axis of the guide remains constant in all positions of rotation of the handle about its own axis.

[*Official Gazette July 5, 1932.*]